United States Patent

[11] 3,543,855

| [72] | Inventors | Paul E. Blatz;<br>James O. Erickson, Laramie, Wyoming |
|---|---|---|
| [21] | Appl. No. | 844,710 |
| [22] | Filed | June 17, 1969<br>Division of Ser. No. 576,530, Sept. 1, 1966, now Patent No. 3,475,515. |
| [45] | Patented | Dec. 1, 1970 |
| [73] | Assignee | Mobil Oil Corporation<br>a corporation of New York |

[54] OIL RECOVERY PROCESS
5 Claims, No Drawings

[52] U.S. Cl. ................................................ 166/274,
166/275; 252/8.55; 260/875
[51] Int. Cl. ........................................................ E21b 43/20,
E21b 43/22

[50] Field of Search ..............................................
252/8.55(D); 166/308, 309, 274

[56] References Cited
UNITED STATES PATENTS

| 3,002,960 | 10/1961 | Kolodney ..................... | 260/897 |
| 3,070,158 | 12/1962 | Roper et al. .................. | 166/275 |
| 3,098,838 | 7/1963 | Goldberg et al. .............. | 260/875 |
| 3,147,117 | 9/1964 | Wainer et al. ................. | 96/48 |

*Primary Examiner*—Herbert B. Guynn
*Attorneys*—William J. Scherback, Frederick E. Dumoulin, James C. Fails, Donald L. Dickerson and Sidney A. Johnson

ABSTRACT: An oil recovery process employing as an injection medium a viscous aqueous solution of a graft copolymer comprising hydrolyzed vinyl methyl ether-maleic anhydride copolymer having grafted thereon polyacrylamide.

OIL RECOVERY PROCESS

This application is a division of U.S. Pat. application Ser. No. 576,530, filed Sept. 1, 1966, now U.S. Pat. No. 3,475,515.

This invention pertains to polymers and more particularly to graft copolymers.

High molecular weight polymers that are soluble in water thicken the water very effectively. The thickening which they effect is described in a mathematical relationship:

$$[\eta] = KM^a \quad (1)$$

where
[$\eta$] is the intrinsic viscosity,
K and $a$ are constants for a given polymer-solvent system, and
M is the molecular weight of the polymer.

Unfortunately, there are limits of molecular weights to which water-soluble polymers can be synthesized. This limits the achievable viscosity of a water solution.

In accordance with the invention, there is provided a new and improved oil recovery process wherein a viscous aqueous solution of a graft copolymer is injected into a subterranean oil formation. The graft copolymer is present in a concentration within the range of from about 0.001 to about 1.0 percent by weight and comprises hydrolyzed poly(vinyl methyl ether, maleic anhydride) interpolymeric units grafted together with polyacrylamide. The hydrolyzed poly(vinyl methyl ether, maleic anhydride) may also be identified by alternative nomenclature as "hydrolyzed vinyl methyl ether-maleic anhydride copolymer". The process of grafting acrylamide monomeric units onto the hydrolyzed poly(vinyl methyl ether, maleic anhydride) interpolymeric units, the polymerizing of the acrylamide and the ultimate joinder of similar halves to form the graft copolymer is referred to herein as interpolymerization. The graft copolymer thus comprises hydrolyzed poly(vinyl methyl ether, maleic anhydride) interpolymerized with polyacrylamide.

The interpolymerization of the poly(vinyl methyl ether, maleic anhydride) with polyacrylamide is carried out in an aqueous solution using photon initiation techniques. The energy level or frequency of the light serving as the source of photons to initiate the reaction depends upon whether a vinyl methyl ether, hydrolyzed maleic anhydride monomeric unit or a vinyl iodide, hydrolyzed maleic anhydride monomeric unit is employed as the site in the interpolymer where grafting occurs. The selection of the appropriate frequency will be described in more detail hereinafter in connection with alternative methods of preparing the graft copolymer.

The poly(vinyl methyl ether, maleic anhydride) reactant is an interpolymer that is well known. It is commercially available as Gantrez AN of different molecular weights. The poly(vinyl methyl ether, maleic anhydride) employed in the work described herein had a molecular weight of about 1000, had a 1:1 ratio of vinyl methyl ether and maleic anhydride, and had a structural formula as illustrated in Formula (2):

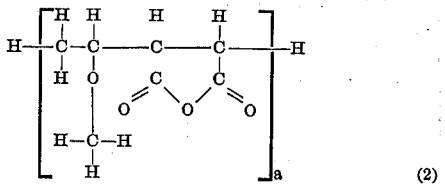

(2)

The interpolymer dissolves in water with hydrolysis of the maleic anhydride to form internal succinic acids as illustrated in Formula (3):

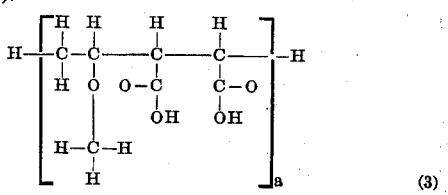

(3)

However, the internal succinic acids are referred to herein as hydrolyzed maleic anhydride for clearer identification with the starting interpolymer.

Acrylamide monomer is the other primary reactant employed in preparing the graft copolymer. Acrylamide is well known also and it is believed unnecessary to describe it here. When grafted onto the hydrolyzed poly(vinyl methyl ether, maleic anhydride), it forms a repeating acrylamide monomer, in a polyacrylamide chain, which has a structural formula as illustrated in Formula (4):

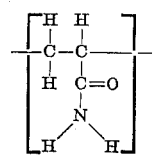

(4)

We do not wish to be limited to the consequences of a particular theory. Apparently, however, the interpolymerization reaction is initiated by forming a free radical in one of the monomeric units of the interpolymer, hydrolyzed poly(vinyl methyl ether, maleic anhydride). The acrylamide monomer readily attaches itself to any free radical formed in the interpolymer. Furthermore, the acrylamide monomer polymerizes with itself and propagates the free radical end to form a polyacrylamide chain grafted onto the hydrolyzed poly(vinyl methyl ether, maleic anhydride). Ultimately, the free radical end contacts a similar free radical end of a polyacrylamide chain grafted onto hydrolyzed poly(vinyl methyl ether, maleic anhydride), and the interpolymerization reaction is terminated.

We have found two methods by which the interpolymerization reaction can be initiated. Each of these methods indicates that the foregoing theory is correct. If the foregoing theory is correct, the respective ways afford alternative approaches to forming the requisite free radical to initiate the interpolymerization reaction. In any event, the material which follows describes alternative methods for preparing the graft copolymer.

In the first method of preparing the graft copolymer, an aqueous solution of the reactants is irradiated by ultraviolet through pyrex glass in a reaction vessel. Specifically, for example, the poly(vinyl methyl ether, maleic anhydride) is dissolved in an aqueous solution. The solution is introduced into a pyrex glass reaction vessel. Monomeric acrylamide is then added to the aqueous solution in the pyrex reaction vessel. To initiate the interpolymerization reaction, the mixture is irradiated by passing ultraviolet light through the pyrex glass and into the aqueous solution. Further, the ultraviolet light is employed throughout the interpolymerization reaction which may take from about 2 to about 6 hours. The reacting mixture, further, may be stirred continuously or only intermittently. The resulting graft copolymer reaction product is a gel-like solid which is water soluble.

The following theory is given to explain the interpolymerization reaction observed and is not to be construed as a limitation. Apparently, however, the pyrex glass transmits only the lower frequencies of the ultraviolet light, filtering out light of wave lengths below about 325 millimicrons. Thus, the light which is transmitted has an energy great enough to initiate the reaction. However, there is filtered out the higher frequency ultraviolet light that causes direct polymerization of the acrylamide monomer, and that causes the formation of too many free radicals which initiate a higher proportion of undesirable multiple chain linkages.

We believer the interpolymerization reaction proceeds according to the following mechanism:

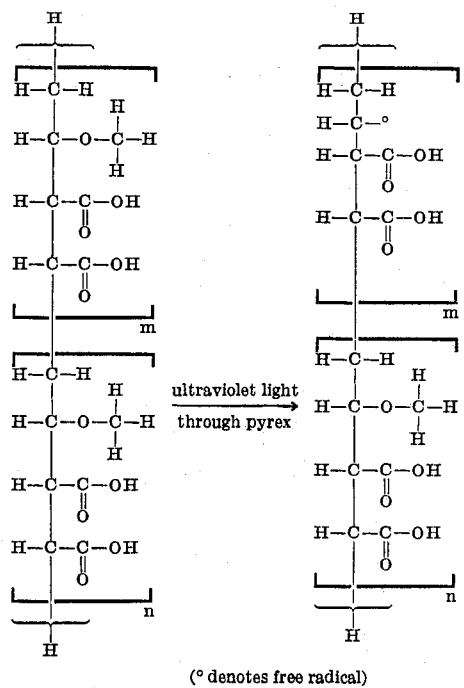

(° denotes free radical)

Desirably $\underline{m} = 1$ and $\underline{n} =$ the remaining monomer units in the interpolymer. The acrylamide grafts onto the free radical, polymerizes with itself to form a polyacrylamide chain on the monomer unit where the graft initiated, and propagates a free radical end for further polymerizing reactions, as shown in Formula (6):

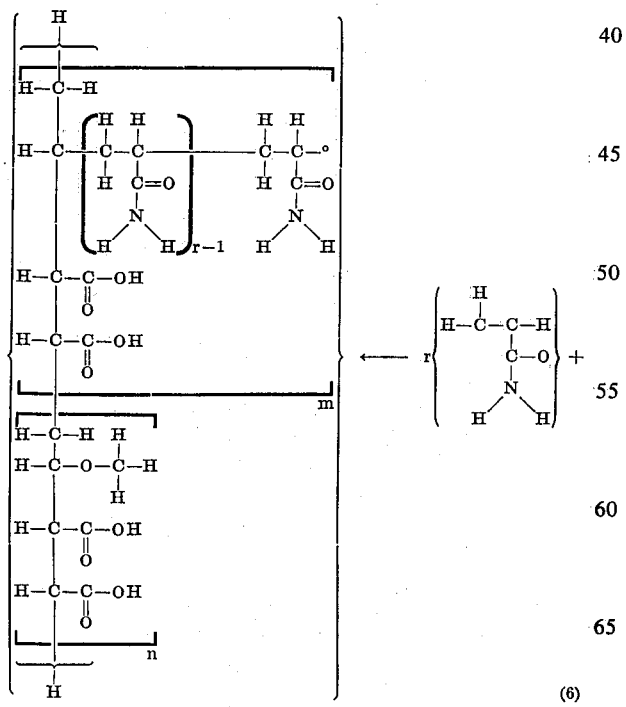

(6)

Finally, the free radical end comes in contact with another free radical end of a similar unit. When this happens, the two free radical ends join and the reaction is terminated, forming the graft copolymer, illustrated by Formula (7):

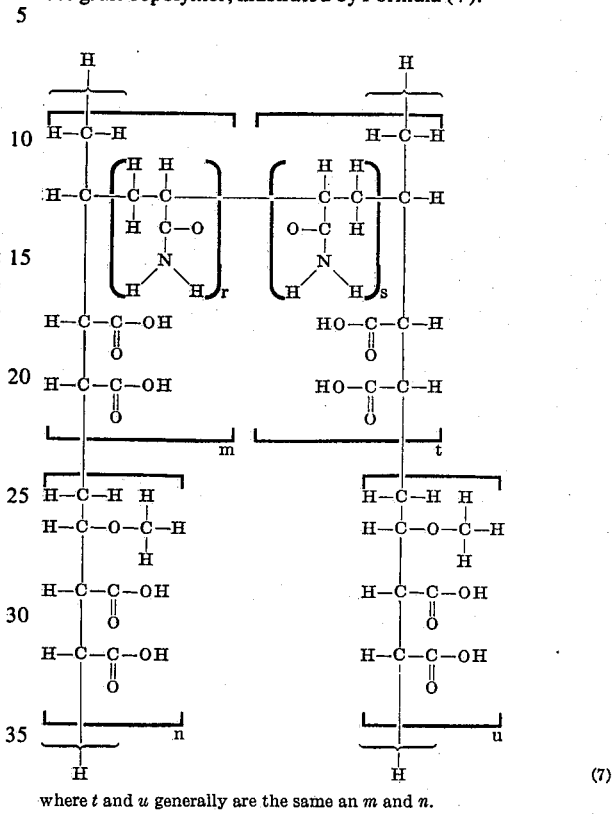

(7)

where $t$ and $u$ generally are the same an $m$ and $n$.

Alternatively, the graft copolymer may be prepared by reacting about one of the monomeric units of the hydrolyzed poly(vinyl methyl ether, maleic anhydride) with hydrogen iodide to form a vinyl iodide, maleic anhydride monomeric unit. The vinyl iodide, maleic anhydride monomeric unit will undergo the interpolymerization reaction with acrylamide in aqueous solution, as described above, when visible light is passed thereinto. Further, it is unnecessary to employ a pyrex glass reaction vessel since any reaction vessel which is transparent to or allows irradiation of the reactants by visible light enables initiation of the reaction.

We believe the alternative interpolymerization reaction proceeds according to the following mechanism:

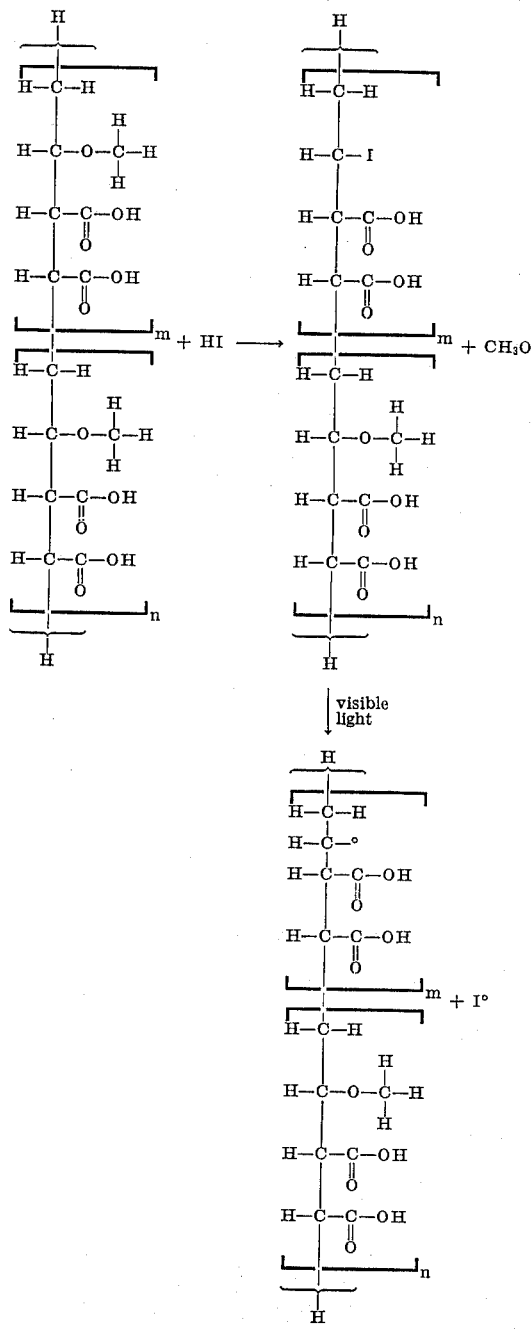

As previously noted, desirably $m = 1$ and $n =$ the remaining monomer units in the interpolymer. The acrylamide grafts onto the free radical, polymerizes with itself to form a polyacrylamide chain on the monomer unit where the graft initiated, and propagates a free radical end, as illustrated in Formula (6). The free radical end finally comes in contact with another free radical end of a similar unit. When this happens, the two free radical ends join and the reaction is terminated, forming the graft copolymer, illustrated by Formula (7).

The molecular weight of the graft copolymer is controlled by the concentration of the acrylamide in the reaction mixture and the ratio of the poly(vinyl methyl ether, maleic anhydride) to the acrylamide in the aqueous solution. In general, the greater the concentration of the acrylamide, the greater will be the molecular weight. On the other hand, the molecular weight of the reaction product does not show a simple trend with the ratio of poly(vinyl methyl ether, maleic anhydride) to acrylamide. Ratios of poly(vinyl methyl ether, maleic anhydride) to acrylamide have been varied from 1:40 to 1:4, based on the weight of reactants. The reaction product having the maximum viscosity was obtained with a ratio of about 1:20. The graft copolymers having molecular weights estimated to be from about 1,000,000 to about 10,000,000, based on the viscosity studies, can be produced.

The reaction proceeds well at temperatures from 25° C. to 50° C. There does not appear to be any critical temperature range. Of course, temperatures which alter characteristics of the reactants are to be avoided. For example, temperatures outside the range of 0° C. to 100° C., which change the liquid water to vapor or solid, should be avoided.

In employing the graft copolymer, the concentration thereof to be incorporated into an aqueous solution will depend upon the viscosity desired. The viscosity desired depends, in turn, upon the application of the viscous aqueous solution. The viscosities desired for various applications may run as low as 2 or 3 centipoises or up as high as 10,000 centipoises. Employing higher concentrations of graft copolymer results in higher viscosities of the aqueous solution. Because the graft copolymer is so effective in increasing the viscosity of the aqueous solution, a concentration thereof as low as 0.001 percent by weight affords significant increase in the viscosity of the aqueous solution. A concentration of from about 0.005 to 0.1 percent by weight of graft copolymer is adequate to afford the required viscosity in the aqueous solution for most purposes. For some uses, such as cosmetic formulations or in plugging an extremely permeable stratum in a subterranean formation as described hereinafter, concentrations as high as about 1.0 percent by weight, or greater, may be employed. At concentrations greater than about 1.0 percent by weight, extremely high viscosities are obtained and the solutions resemble gels.

One of the most significant applications for the viscous aqueous solutions is in the production of oil from a subterranean formation. In this application, the viscous aqueous solution is injected as a slug through an injection well into the oil-containing subterranean formation to help produce oil therefrom.

As is well known, the oil accumulated in subterranean formations is produced through wells drilled thereinto. After the first stage of production is completed, often referred to as primary depletion, much oil remains in the subterranean formation. One of the most widely used techniques to attempt to recover this remaining oil is the injection of a fluid through injection means, comprising one or more injection wells, into the formation. Oil is displaced from within the formation by the injected fluid and may be produced through production means, comprising one or more production wells, to the surface. The fluid which is injected through the injection means and into the formation tends to develop fingers and to flow more readily through the more permeable sections of the subterranean formation than does the oil. As a result, the injected fluid breaks through, i.e., is produced, at the production well before the desired amount of oil has been displaced from within the subterranean formation and produced at the production well. One of the common injection fluids is water, in which case the operation is termed a waterflood. The injected water is termed flooding water.

As has been described in numerous publications, the mobility of a slug of water can be tailored by increasing its viscosity to approach the mobility of the oil in the formation. With matching of mobility, the tendency to finger is minimized and the viscous water thus enables recovery of a large percentage of the oil before breakthrough of the injected fluid occurs at the production well.

Inclusion of the graft copolymer in a portion of the flooding water, as described hereinafter, does not require special equipment over that ordinarily employed in carrying out a waterflood.

When the viscous aqueous solution of the invention is employed in waterflooding a subterranean formation, a concentration of the graft copolymer as low as about 0.001 percent by weight of the flooding water affords appreciable increases in its viscosity and is beneficial. Preferably, a concentration of from about 0.005 to about 0.1 percent by weight of the graft copolymer is employed in the flooding water. Infrequently, it may be desirable to plug an extremely permeable stratum in a subterranean formation. In such instances, a slug of flooding water containing as high as 1.0 percent by weight, or more, of the graft copolymer may be employed to flow selectively into this more permeable stratum and reduce the permeability therein.

Ordinarily, the slug of flooding water containing graft copolymer is in the amount of from about 0.01 to about 0.2 pore volume of the formation. Smaller sized slugs of flooding water from about 0.001 to about 0.01 pore volume containing up to 1.0 percent by weight or more of the graft copolymer may be employed in the event that plugging of an extremely permeable stratum is desired. The smaller sized slugs, when necessary, may be followed advantageously by the ordinary sized slugs of flooding water containing the lower concentration of the graft copolymer.

The following example illustrates the preparation of the graft copolymer comprising poly (vinyl methyl ether, maleic anhydride) interpolymerized with polyacrylamide and viscosities of its aqueous solutions.

EXAMPLE

In preparing the graft copolymer in this example, 2 milliliters of a 5 percent solution of Gantrez AN-119 and 2 grams of acrylamide were dissolved in about 20 milliliters of water in a small Erlenmeyer flask. Nitrogen was then bubbled through the solution for 5 minutes to eliminate oxygen. A magnetic stirrer bar was added and the flask tightly stoppered with a rubber stopper. A Hanovia mercury lamp equipped with a Vicar heat-reflecting filter was placed at 20 centimeters distance from the flask and used to irradiate the flask and its contents during the reaction. The contents of the flask were stirred during the irradiation and reaction using a magnetic stirrer. A significant increase in viscosity was observed within 2 hours. The viscosity continued to increase with time of irradiation until after 3 hours a gel was formed. The resulting graft copolymer mixture was precipitated from the aqueous solution by slowly pouring it into a large excess of vigorously stirred methanol. When precipitated and dried overnight in a vacuum of 50° C., the final graft copolymer reaction product was a white powder. The yield of the reaction was about 90 percent, based on the weight of reactants.

Various concentrations of the graft copolymer were dissolved in water and viscosities determined at 25° C. for the resulting aqueous solutions. The results are shown in the following table.

TABLE

| Concentration of graft copolymer in water:[1] | Relative viscosity |
|---|---|
| 0.036 | 1.292 |
| 0.072 | 1.579 |
| 0.180 | 2.777 |

[1] Grams per 100 milliliters.

The intrinsic viscosity, defined as $$\frac{(\text{relative viscosity}) - 1}{\text{concentration}}$$

thus, is calculated to be a best value of about eight.

Since many applications demand a high viscosity in the presence of electrolytes, 0.072 gram of the graft copolymer was dissolved in 100 milliliters of 1 molar sodium chloride solution. The relative viscosity at 25° C. was 1.5016 The calculated intrinsic viscosity still shows a value of about 7. Thus, the graft copolymer apparently had very little charge and retained its desirable thickening capabilities in the presence of even the strong electrolyte, sodium chloride.

Using the formula:

intrinsic viscosity $= 3.73 \times 10^{-4}(M)^{0.66}$, for determining the molecular weight in salt solution, the molecular weight was calculated to be about 3,000,000.

Having thus described the invention, it will be understood that such description has been given by way of illustration and example and not by way of limitation, reference for the latter purpose being had to the appended claims.

We claim:

1. In a method for the recovery of oil from an oil-containing subterranean formation wherein a fluid is injected through an injection means and into said formation, the improvement comprising injecting through said injection means and into said formation a viscous aqueous solution comprising water having incorporated therein a total polymer concentration of from about 0.001 to about 1.0 percent by weight of a graft copolymer comprising a hydrolyzed vinyl methyl ether-maleic anhydride copolymer having grafted thereon polyacrylamide.

2. The method of claim 1 wherein said total polymer concentration is from about 0.005 to about 0.1 percent by weight of said graft copolymer.

3. The method of claim 1 wherein said viscous aqueous solution is injected as a slug of from about 0.01 to about 0.2 pore volume.

4. The method of claim 1 wherein said viscous aqueous solution is a slug of from about 0.001 to about 0.01 pore volume of flooding water containing up to 1.0 percent by weight of said graft copolymer.

5. The method of claim 1 wherein said viscous aqueous solution is injected as a slug of from about 0.001 to about 0.01 pore volume of flooding water containing a concentration up to 1.0 percent by weight of said graft copolymer, and followed by a slug of from about 0.01 to about 0.2 pore volume of flooding water containing 0.005 to about 0.1 percent by weight of said graft copolymer.